United States Patent [19]

Fujishima

[11] Patent Number: 4,835,758
[45] Date of Patent: May 30, 1989

[54] DROPOUT DETECTION DEVICE FOR AN OPTICAL TYPE DISC PLAYBACK DEVICE

[75] Inventor: Masakazu Fujishima, Hamamatsu, Japan

[73] Assignee: Yamaha Corporation, Hamamatsu, Japan

[21] Appl. No.: 28,758

[22] Filed: Mar. 23, 1987

[30] Foreign Application Priority Data

Mar. 26, 1986 [JP] Japan ................... 61-67943

[51] Int. Cl.$^4$ ............................... G11B 7/00
[52] U.S. Cl. ...................... 369/58; 358/336; 358/54; 369/124
[58] Field of Search ............ 369/124, 53–58, 369/46; 358/336, 314, 342

[56] References Cited

U.S. PATENT DOCUMENTS 3,925,605  12/1975  Rennick ................... 358/336

Primary Examiner—Robert L. Richardson
Attorney, Agent, or Firm—Spensley Horn Jubas & Lubitz

[57] ABSTRACT

A dropout detection device for use in a device for playing back an optical disc such as a video disc and a Compact Disc comprises a four-split photodetector receiving laser beam through a disc on which information is recorded, a sum signal generation circuit for generating sum signals of output signals of two detectors positioned on diagonals of the four-split photodetector, and a dropout detection circuit for detecting difference in the waveform between two output sum signals of the sum signal generation circuit. A dropout in a reproduced signal is detected directly on the basis of result of detection by the dropout detection circuit without subjecting the reproduced signal to other signal processings so that a simplified circuit design can be realized.

8 Claims, 5 Drawing Sheets

DROPOUT DETECTION DEVICE FOR AN OPTICAL TYPE DISC PLAYBACK DEVICE

BACKGROUND OF THE INVENTION

This invention relates to a dropout detection device for a device for playing back optical type discs such as Compact Disc in the Compact Disc Digital Audio System standard and a video disc according to the Laser Vision standard. The invention is directed to a dropout detection device capable of detecting a dropout in a reproduced signal with a simple construction.

A dropout in a reproduced signal from an optical type disc is produced due to various causes such as mixing of dust or forming of a pin hole in the material of the disc during manufacture of the disc and dirt or scratch on the surface of the disc. The dropout causes noise in a reproduced picture or sound. It is therefore a general practice to detect a dropout in a reproduced signal and substitute the section in which the dropout has occurred by a substitution signal.

In a prior art dropout detection device, detection of a dropout is made by examining the level of an output signal and judging that a dropout has occurred when there has been an abnormally large change in the level of the output signal.

An example of a video disc playback device including such prior art dropout detection device is shown in FIG. 2. A general structure of this video disc playback device is disclosed in, for example, a Japanese magazine entitled "Radio Technique", January 1986, Pages 164–168 (FIG. 1) and the prior art dropout detection device is disclosed in, for example, Japanese Patent Preliminary Publication No. 51-8822 as a prior art.

Referring to FIG. 2, a signal recorded on a disc 10 is read by an optical pickup 12. In the optical pickup 12, laser beam reflected by the disc 10 is received by a four-split photodiode 14 and tracking photo-diodes 16 and 18 through a cylindrical lens. The four-split photodiode 14 adds detected outputs on each diagonal among four detected outputs A, B, C and D together and thereupon produces signals A+C and B+D. The tracking photo-diodes 16 and 18 provide signals E and F respectively.

The signals A+C and B+D are subject to subtraction between themselves by a subtractor 20 for detecting a focus error. A focus servo circuit 22 drives a focus coil 24 so that the focus error will be reduced to zero.

The signals E and F are subject to subtraction between themselves by a subtractor 26 for detecting a tracking error. A tracking servo circuit 28 drives a tracking coil 30 so that the tracking error will be reduced to zero.

The signals A+C and B+D are added together by an adder 32. The sum signal A+B+C+D is amplified by an HF amplifier 34, is subject to FM detection by an FM detection circuit 36 and thereafter is applied to a synchronizing signal detection circuit 38 for detection of a horizontal synchronizing signal. A disc servo circuit 40 compares a detected horizontal synchronizing signal with a reference clock from a reference signal generator 42 in frequency and phase and controls a disc motor 44 so that these signals coincide with each other.

A main TBC (Time Base Collector) 46 removes jitter (sway on time axis) contained in a reproduced signal from the disc and this circuit 46 is constructed in the form of a delay circuit for continuously delaying a binary signal. As such delay circuit, a circuit utilizing the signal delaying chracteristics of a CMOS gate as described in the U.S. Patent Application No. 760,332 for example is employed. A TBC control circuit 48 compares, in phase, a horizontal synchronizing signal detected by passing the output signal of the main TBC 46 through an FM detection circuit 150 and a synchronizing signal detection circuit 152 with a reference clock corresponding to a normal horizontal synchronizing signal and controls delay time of the main TBC 46 in accordance with a phase error between these signals for absorbing the jitter.

An output signal of the main TBC 46 is passed through a band-pass filter 50, an FM detection circuit 52 and a low-pass filter 54 and a left channel audio signal thereby is produced. The output signal of the main TBC 46 is passed also through a band-pass filter 56, an FM detection circuit 58 and a low-pass filter 60 and a right channel audio signal thereby is produced.

The output signal of the main TBC 46 is applied also to a color TBC 64 through a band-pass filter 62. The color TBC 64 is a circuit provided for absorbing minute jitter which has not been absorbed by the main TBC 46. The color TBC 64 is constructed in the form of, for example, a delay circuit for continuously delaying a binary signal by utilizing a CMOS gate circuit as in the case of the main TBC 64. The TBC control circuit 48 compares, in phase, a color burst obtained by passing the output signal of the color TBC 64 through an FM detection circuit 66 and a color subcarrier detection circuit 68 with a reference clock of 3.58 MHz corresponding to a normal color subcarrier and controls delay time of the color TBC 64 in accordance with a phase error between these signals for absorbing the minute jitter contained in the reproduced signal.

The output signal of the color TBC 64 is applied to the FM detection circuit 66 for FM detection and thereafter is provided as a video signal from a terminal a of a switch 70.

A dropout detection circuit 72 detects a dropout in a reproduced signal and comprises an FM detection circuit 74 and a level comparator (window comparator) 76. The output of the band-pass filter 62 is FM detected by the FM detection circuit 74 and its level is detected by the level comparator 76. If there is a dropout in the reproduced signal from the disc, a noise of a large level as shown in FIG. 3 is produced when the video FM signal is FM-detected. Accordingly, by comparing the output of the FM detection circuit 74 with suitably established upper and lower detection levels of the level comparator 76, the dropout can be detected.

If a dropout has been detected, the switch 70 is switched to a terminal b side by a control circuit 78 during one horizontal scanning period 1H. Since a signal which has been delayed for 1H by a 1H delay circuit 80 and FM-detected by an FM detection circuit 82 is provided to the b terminal side, a signal which has interpolated a section of 1H in which the dropout has occurred with the preceding 1H section is provided by the switch 70 whereby correction of the dropout is achieved.

Since this dropout detection circuit 72 detects the dropout by watching an amplitude modulation component in a reproduced signal, the dropout cannot be detected until an FM video signal has been FM-detected by the FM detection circuit 74. Accordingly, this dropout detection circuit 72 necessitates a rather complicated circuit construction.

It is, therefore, an object of the invention to provide a dropout detection circuit for an optical type disc playback device capable of detecting a dropout from an original reproduced signal without subjecting it to the FM detection.

SUMMARY OF THE INVENTION

The dropout detection circuit for achieving the above described object of the invention detects a dropout by detecting difference in the waveform between two sum signals of a four-split photodetector.

The dropout detection circuit according to the invention is characterized in that it comprises a foursplit photodetector receiving laser beam through a disc on which information is recorded, sum signal generation means for generating sum signals of output signals of two detectors positioned on diagonals of the four-split photodetector, and dropout detection means for detecting difference in the waveform between two output sum signals of the sum signal generation means, a dropout in a reproduced signal being detected on the basis of result of detection by the dropout detection means.

If there is no dropout, two sum signals assume substantially the same waveform. If a dropout has occurred, the two sum signals become different in the waveform from each other. The two sum signals are both distorted in the waveform but it is extremely unlikely that the two sum signals are distorted in the same form. Accordingly, by comparing the two sum signals in waveform and watching difference in the waveform, the dropout can be detected. The dropout can therefore be detected from an original reproduced signal without subjecting the reproduced signal to a signal processing such as FM detection so that the circuit construction can be simplified.

Difference in the waveform between the two sum signals can be detected by, for example, detecting difference in frequency between the two sum signals. Such difference in frequency can be detected by, for example, watching whether the waveforms of the two sum signals are produced alternately or not. If the two waveforms are produced alternately, it is judged that the two waveforms are equal in frequency and therefore there is no dropout whereas if the two waveforms are not produced alternately, it is judged that the two waveforms are different in frequency so that a dropout has occurred.

In a preferred embodiment of the invention, as a specific means for detecting a dropout by watching whether the two waveforms are produced alternately, whether zero crossings in the two waveforms are produced alternately or not is detected by a shift register. This enables detection of a dropout with a very simple circuit construction.

A preferred embodiment of the invention will now be described with reference to the accompanying drawings.

DESCRIPTION OF THE DRAWINGS

In the accompanying drawings,

FIGS. 5 through 7 are waveform diagrams for explaining operation of the dropout detection circuit 84 shown in FIG. 4 in which FIG. 5 shows a condition in which there is no dropout and FIGS. 6 and 7 show a condition in which a dropout has occurred.

DESCRIPTION OF A PREFERRED EMBODIMENT

Figure 1:
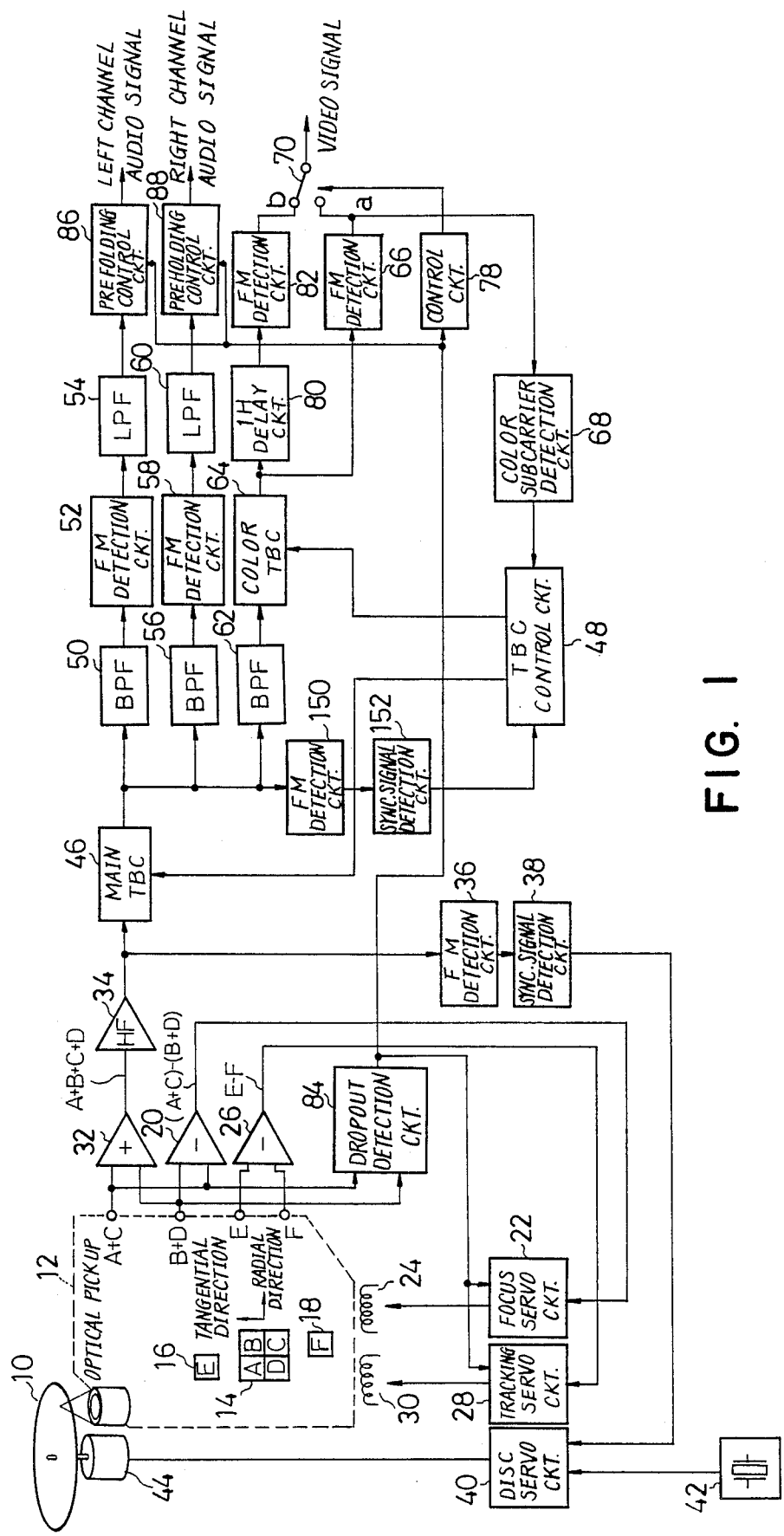
FIG. 1 is a block diagram showing an embodiment of the invention.
Figure 2:
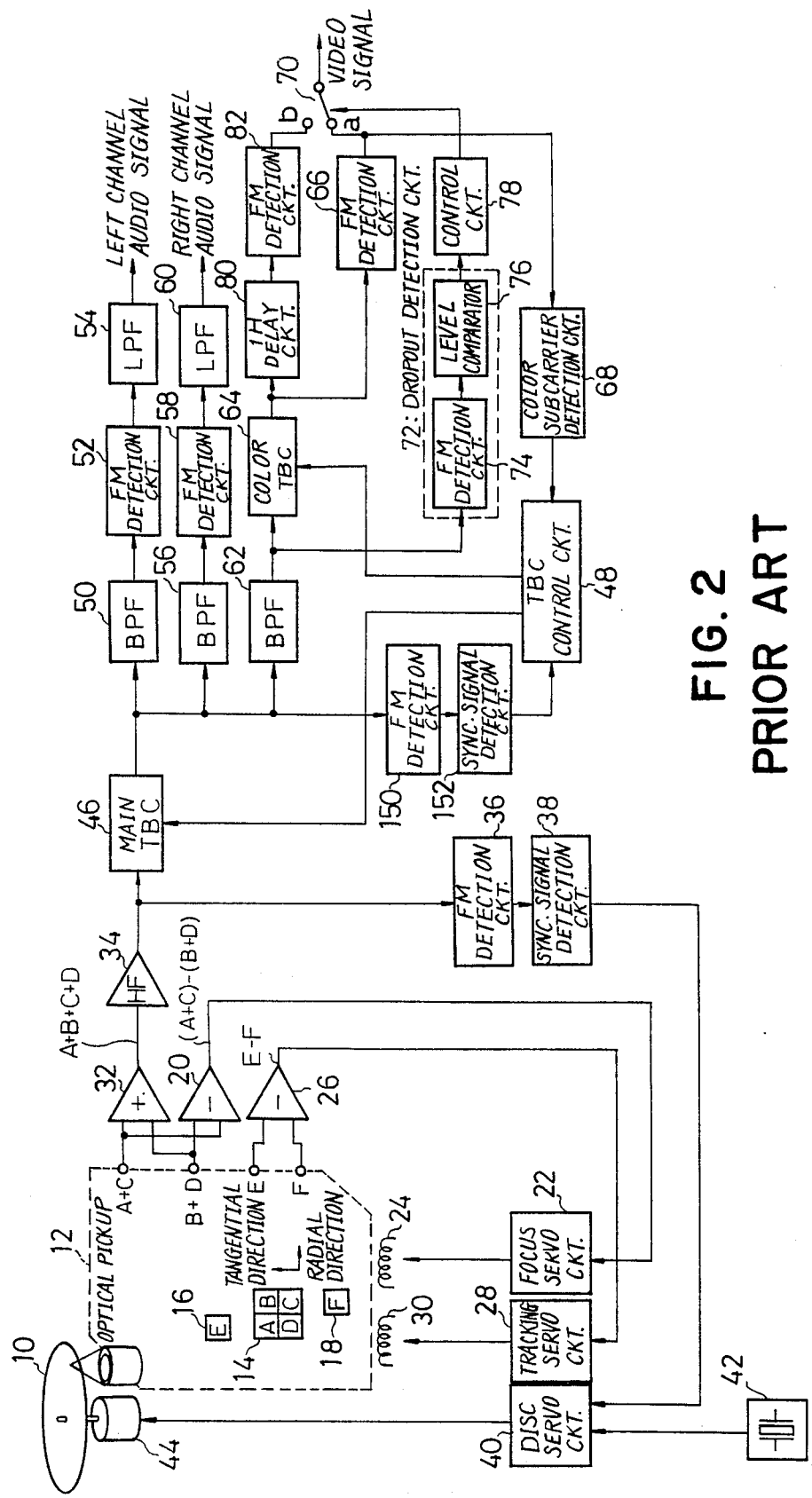
FIG. 2 is a block diagram showing a prior art dropout detection circuit.
Figure 3:
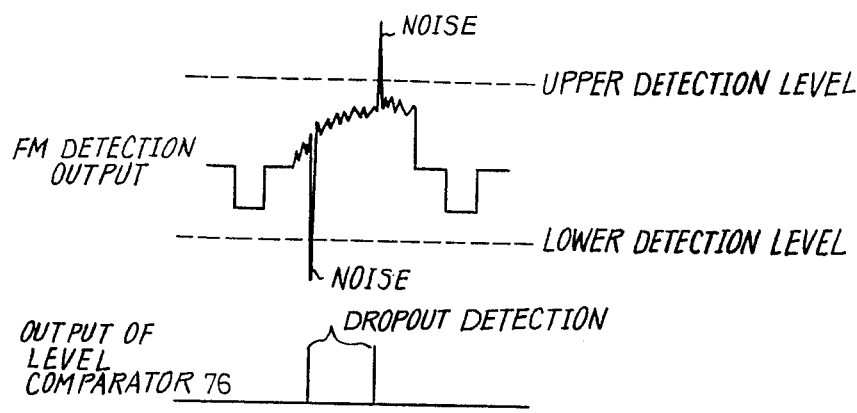
FIG. 3 is a waveform diagram for explaining operation of the prior art dropout detection circuit shown in FIG. 2.

In FIG. 1 which shows an embodiment of the invention, the same component parts as in the prior art device shown in FIG. 2 are designated by the same reference characters and detailed description thereof is omitted.

In FIG. 1, a dropout detection circuit 84 which detects a dropout in a reproduced signal compares waveforms of two sum signals A+C and B+D of a foursplit photodiode 14 and judges that there is no dropout if the two waveforms are the same and that a dropout has occurred if the two waveforms are not the same.

When a dropout has been detected, a switch 70 is switched to a terminal b side during a horizontal scanning period 1H by a control circuit 78. In the terminal b side, a signal obtained by delaying the output signal of a color TBC 64 by a period of 1H by a 1H delay circuit 80 and FM-detecting it by an FM detection circuit 82 is provided so that a signal which has interpolated a 1H section in which the dropout has occurred with the preceding 1H section is provided from the switch 70 and the dropout thereby is corrected.

Since no accurate focus error signal or tracking error signal is obtained when the dropout has occurred, a focus servo circuit 22 and a tracking servo circuit 28 perform the focus servo and tracking servo controls holding a focus error signal and a tracking error signal before the dropout has occurred during the section in which the dropout has occurred. Since a noise is generated also in the audio signal when the dropout has occurred, preholding control circuits 86 and 88 hold and output audio signals of left and right channels existing immediately before the dropout has occurred during the section in which the dropout has occurred.

Figure 4:
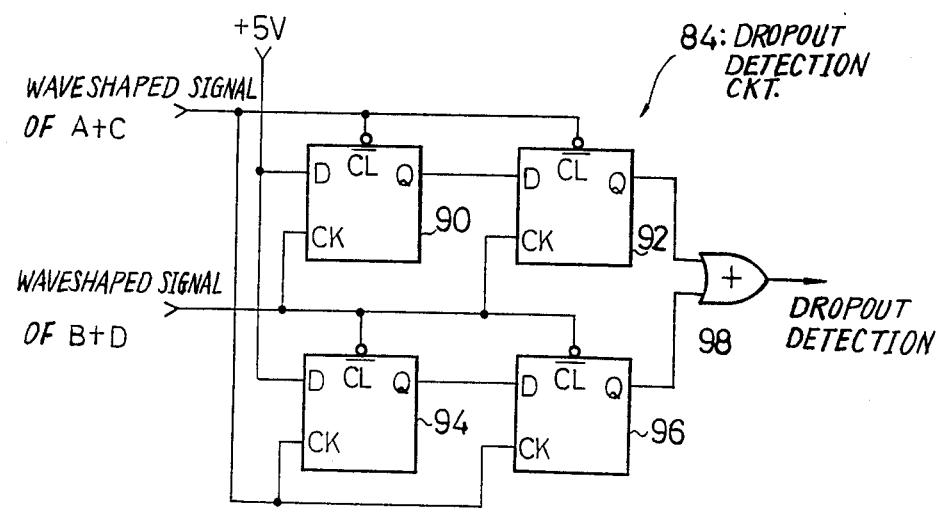
FIG. 4 is a block diagram showing an example of a specific circuit of the dropout detection circuit 84 shown in FIG. 1.

A specific example of the dropout detection circuit 84 is shown in FIG. 4. In this example, the dropout is detected by counting the number of zero-crossings of the two sum signals A+C and B+D and the circuit is a simple one comprising a resettable shift register.

In D flip-flop circuits 90, 92, 94 and 96, if their clock input CK is turned to "1" when their D input is "1", their Q output is turned to "1" at the rising of the clock input CK whereas if their clear input $\overline{CL}$ is turned to "0", the Q output is turned to "0" at the falling of the clear input e,ovs/CL/ . The D flip-flop circuits 90 and 92 are provided for detecting a condition in which the period of the sum signal B+D becomes shorter than the period of the sum signal A+C. The D flip-flop circuits 94 and 96 are provided for detecting a condition in which the period of the sum signal A+C becomes shorter than the period of the sum signal B+D.

The D flip-flop circuit 90 receives a level "1" at its D input, a signal obtained by waveshaping the sum signal B+D by comparing it at a zero level at its clock input CK and a signal obtained by waveshaping the sum signal A+C by comparing it at a zero level at its clear input $\overline{CL}$. The D flip-flop circuit 92 receives the Q output of the D flip-flop circuit 90 at its D input, a signal obtained by waveshaping the sum signal B+D at its clock input CK and a signal obtained by waveshaping the sum signal A+C at its clear input $\overline{CL}$.

The D flip-flop circuit 94 receives a level "1" at its D input, a signal obtained by waveshaping the sum signal A+C at its clock input CK and a signal obtained by waveshaping the sum signal B+D at its clear input $\overline{CL}$. The D flip-flop circuit 96 receives the Q output of the flip-flop circuit 94 at its D input, a signal obtained by waveshaping the sum signal A+C at its clock input CK and a signal obtained by waveshaping the sum signal B+D at its clear input $\overline{CL}$.

The Q outputs of the D flip-flop circuits 92 and 96 are provided as dropout detection signals through an OR gate 98.

Figure 5:
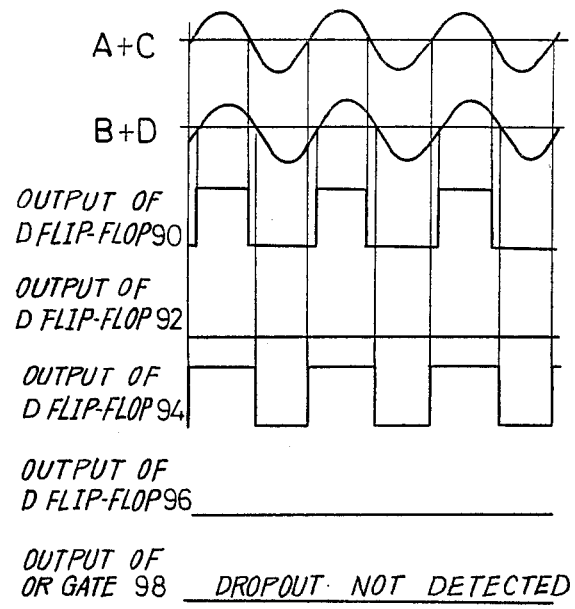
Figure 6:
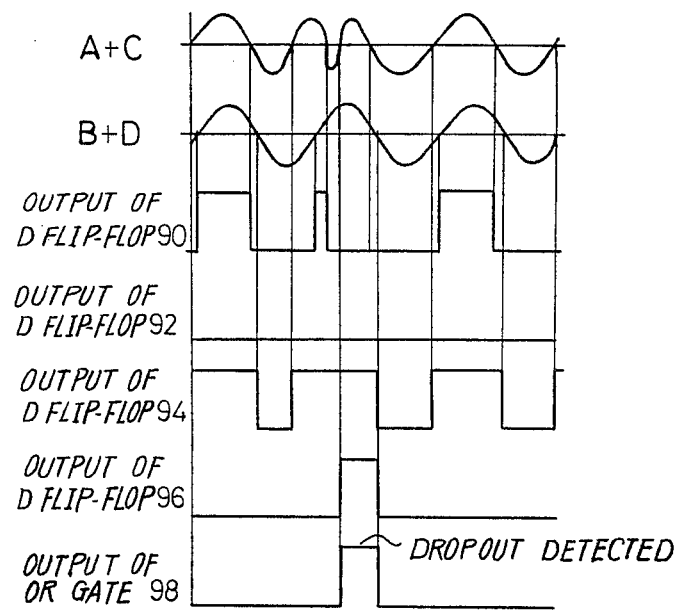
Figure 7:
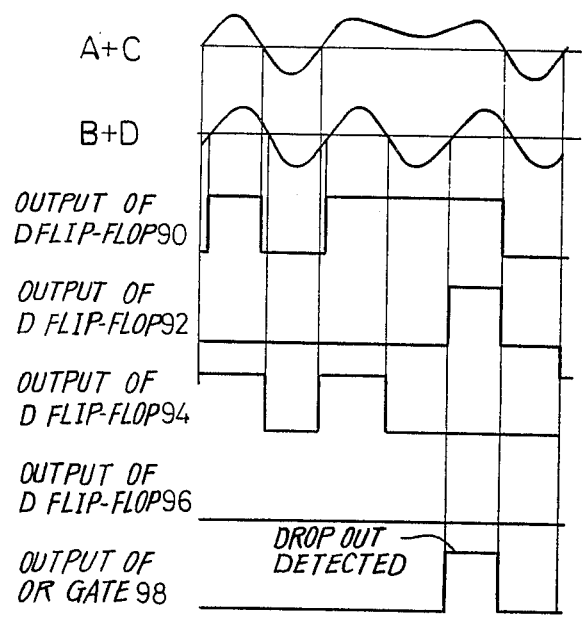

The operation of the dropout detection circuit 84 of FIG. 4 is shown in FIGS. 5 through 7.

FIG. 5 shows a condition in which there is no dropout. Since zero-crossings of the sum signal A+C in rising (or falling) and zero-crossings of the sum signal B+D in falling (or rising) occur alternately, the D flip-flop circuits 90 and 94 are cleared before the clock input CK of the D flip-flop circuits 92 and 96 rises to "1" while the D flip-flop circuits 92 and 96 are not set so that their Q outputs remain "0". Accordingly, the output of the OR gate 98 remains "0" indicating that there is no dropout.

FIG. 6 shows a condition in which a dropout has occurred and a part of the period of the sum signal A+C has become shorter than a normal period. In this section, while zero-crossing in rising of the sum signal B+D is applied to the clock input CK of the D flip-flop circuits=90 and 92, zero-crossing in falling of the sum signal A+C is applied to the clear input $\overline{CL}$ twice consecutively so that the D flip-flop circuit 92 is not set. In the D flip-flop circuit 94, however, while zero-crossing in falling of the sum signal B+D is applied to the clear input $\overline{CL}$, zero-crossing in rising of the sum signal A C is applied to the clock input CK twice consecutively so that the D flip-flop circuit 96 is set upon the second application of the zero-crossing and a dropout detection signal is provided from the OR gate 98.

FIG. 7 shows a condition in which a dropout has occurred and a part of the period of the sum signal A+C has become longer than a normal period. In this section, while zero-crossing in rising of the sum signal A+C is applied to the clock input CK of the D flip-flop circuits 94 and 96, zero-crossing in falling of the sum signal B+D is applied to the clear input $\overline{CL}$ twice consecutively so that the D flip-flop circuit 96 is not set. In the D flip-flop circuits 90 and 92, however, while zero-crossing in falling of the sum signal A . C is applied to the clear input $\overline{CL}$, zero-crossing in rising of the sum signal B+D is applied to the clock input CK twice consecutively so that the D flip-flop circuit 92 is set upon the second application of the zero-crossing and a dropout detection signal is provided from the OR gate 98. In the foregoing manner, the dropout in the reproduced signal can be detected.

The foregoing embodiment has been described with respect to an example in which the invention has been applied to a video disc playback device. The invention is generally applicable to video disc playback devices employing a four-split photodetector. That is, the invention is applicable not only to a video disc playback device employing the astigmatic type focus servo but to other types of video disc playback devices employing a four-split photodetector. The invention is applicable also to a Compact Disc playback device and other optical type disc playback devices. In these cases, the dropout detection signal can be utilized for protection of an audio signal and protection of the focus or tracking servo operation.

What is claimed is:

1. A dropout detection device for an optical type disc playback device comprising:
    means for detecting a laser beam received from a disc on which information is recorded and for providing a plurality of output signals corresponding to different portions of said detected laser beam;
    sum signal generation means for generating two sum signals from said plurality of output signals; and
    dropout detection means for detecting differences in the waveforms of the two sum signals of said sum signal generation means, and for providing a signal representing occurrence of a dropout in a reproduced signal based on the result of said detection.

2. A dropout detection device as defined in claim 1 wherein said dropout detection means detects differences in the waveforms of the two sum signals by detecting differences in the periods of the two sum signals.

3. A dropout detection device as defined in claim 2 wherein said dropout detection means determines that the periods of the sum signals are the same if the sum signals are produced alternately and outputs a signal representing absence of a dropout and wherein said dropout detection means determines that the periods of the sum signals are not the same if the sum signals are not produced alternately and outputs the signal representing occurrence of a dropout.

4. A dropout detection device as defined in claim 3 wherein said dropout detection means comprises:
    a first flip-flop circuit which is set upon rising of a first one of said two sum signals and reset upon falling of the second of said two sum signals;
    a second flip-flop circuit which is set upon rising of said first sum signals when said first flip-flop circuit is set and reset upon falling of said second sum signal;
    a third flip-flop circuit which is set upon rising of said second sum signal and reset upon falling of said first sum signal; and
    a fourth flip-flop circuit which is set upon rising of said second sum signal when said third flip-flop circuit is set and reset upon falling of said first sum signal,
    outputs of said second and fourth flip-flop circuits being provided as the signal representing occurrence or absence of a dropout.

5. A dropout detection device for an optical type disc playback device comprising:
    a four-split photodetector positioned to receive a laser beam, the characteristics of said laser beam exhibiting timewise fluctuations representative of information stored on an optical disc, and said four-split photodetector having four quadrants with a first photodetector located in a first quadrant, a second photodetector located in a second quadrant, a third photodetector located in a third quadrant, and a fourth photodetector located in a fourth quadrant, said first and third photodetectors being diagonally opposed, each of said photodetectors detecting a portion of said laser beam and outputting an output signal which rises and falls depending on the fluctuations of the laser beam and the position of the detector;

a first sum signal generation means for generating and outputting a first sum signal, said first sum signal being the sum of the output signals of the first and third photodetectors;

a second sum signal generation means for generating and outputting a second sum signal, said second sum signal being the sum of the output signals of the second and fourth photodetectors;

dropout detection means for detecting a difference between the waveforms of said first sum signal and said second sum signal and outputting a dropout detection signal when a difference is detected, said dropout detection signal being indicative of a dropout in the information stored on the optical disc.

6. A dropout detection device as defined in claim 5 wherein said dropout detection means detects differences in the periods of said first and second sum signals and outputs said dropout detection signal when the periods of said first and second sum signals are different.

7. A dropout detection device as defined in claim 6 wherein said dropout detection means determines that the periods of said first and second sum signals are the same if between any two consecutive rises of the first sum signal there is arise of the second sum signal and if between any two consecutive rises of the second sum signal there is a rise of the first sum signal.

8. A dropout detection device as defined in claim 7 wherein said dropout detection means comprises:

a first flip-flop circuit which is set upon the rise of said first sum signal and reset upon the fall of the second sum signal;

a second flip-flop circuit which is set upon the rise of said first sum signal when said first flip-flop circuit is set and reset upon the fall of said second sum signal;

a third flip-flop circuit which is set upon the rise of said second sum signal and reset upon the fall of said first sum signal; and a fourth flip-flop circuit which is set upon the rise of the second sum signal when said third flip-flop circuit is set and reset upon the fall of said first sum signal, outputs of said second and fourth flip-flop circuits being provided as the dropout detection signal.

* * * * *